(12) United States Patent
Nakamura et al.

(10) Patent No.: US 6,697,798 B2
(45) Date of Patent: Feb. 24, 2004

(54) RETRIEVAL SYSTEM OF SECONDARY DATA ADDED DOCUMENTS IN DATABASE, AND PROGRAM

(76) Inventors: Takahiro Nakamura, 16-7-907, Kitamagome 1-chome, Ota-ku, Tokyo 143-0021 (JP); Masanori Suzuki, c/o Shogakukan Inc. 3-1, Hitotsubashi 2-chome, Chiyoda-ku, Tokyo 101-8001 (JP)

(*) Notice: Subject to any disclaimer, the term of this patent is extended or adjusted under 35 U.S.C. 154(b) by 375 days.

(21) Appl. No.: 09/913,310
(22) PCT Filed: Apr. 24, 2001
(86) PCT No.: PCT/JP01/03506
§ 371 (c)(1), (2), (4) Date: Aug. 10, 2001
(87) PCT Pub. No.: WO02/091234
PCT Pub. Date: Nov. 14, 2002

(65) Prior Publication Data
US 2003/0167260 A1 Sep. 4, 2003

(51) Int. Cl.[7] .................................................. G06F 17/30
(52) U.S. Cl. ....................................................... 707/3
(58) Field of Search ........................... 707/1, 3, 5, 10, 707/102, 4, 104.1; 345/588, 719, 809; 704/256, 257, 270; 709/223

(56) References Cited

U.S. PATENT DOCUMENTS

| | | | | |
|---|---|---|---|---|
| 5,220,625 A | * | 6/1993 | Hatakeyama et al. | 345/809 |
| 6,094,635 A | * | 7/2000 | Scholz et al. | 704/270 |
| 6,202,064 B1 | * | 3/2001 | Julliard | 707/5 |
| 6,397,181 B1 | * | 5/2002 | Li et al. | 704/256 |

FOREIGN PATENT DOCUMENTS

| | | |
|---|---|---|
| EP | 0 851 368 A2 | 7/1998 |
| JP | 6-301735 | 10/1994 |
| JP | 7-65014 | 3/1995 |
| JP | 8-137898 | 5/1996 |

OTHER PUBLICATIONS

Derwent Abstract, Publication No. JP–8137898–A, Date of publication May 31, 1996, 1 page.
International Search Report, dated May 29, 2001, 2 pages.

* cited by examiner

*Primary Examiner*—Diane D. Mizrahi
*Assistant Examiner*—Apu M Mofiz
(74) *Attorney, Agent, or Firm*—Rosenthal & Osha L.L.P.

(57) ABSTRACT

In one embodiment, a retrieval system of a database storing secondary data added documents, using a GUI having data entry fields configured in a matrix, locating data are input in which data entry fields, in the case that more than one column of fields are input, retrieving sentences having the same order of elements in each sentence as the order of columns of fields, searching a database, transmitting search results to a user's display device is disclosed.

11 Claims, 5 Drawing Sheets

FIG. 3

| | | | | | |
|---|---|---|---|---|---|
| Main word | O | O | O | O | O |
| Word | These | women | | | |
| P.O.S. | adjective | | | | |
| Lemma | | | be | | |

☐ Collocation  Max.line No _____
☐ Concordancer  Display line _____

Search  Reset

Sub-corpus _____

Address: http://www.shogakukan/concordancer.html

RETRIEVAL SYSTEM OF SECONDARY DATA ADDED DOCUMENTS IN DATABASE, AND PROGRAM

TECHNICAL FIELD

The present invention relates to a retrieval system having an interface for intuitive operations of retrievals of secondary data added sentences in a database and a program for the system. Further, the present invention relates to a database suitable for high-speed retrievals of secondary data added sentences by using an intuitive interface.

More particularly, the present invention relates to a retrieval system having an intuitively searchable interface for an annotated corpus, an example of secondary data added documents.

BACKGROUND

A sub-string search technique (also known as a full-text search technique) is useful to retrieve sentences, which function as information transmitters, from a collection of texts such as newspaper articles or patent specifications. The same technique is applied to retrievals of HTML documents in the Internet. In this technique only character strings included in texts displayed on a Web-browser are searched, and another parts of HTML documents are neglected.

Though it is possible to use plural key words for one search and to analyze documents whether there is a match between each key word and character strings by using this technique, word order of key words in one sentence is not considered. Because a relationship of key words in a query by this technique is just a simple conjunction.

In this specification, "a document" is a collection of sentences divided by a period and the like, expressing character information of something organized such as a newspaper article. An element of "a document" ended by a period and the like is "a sentence".

In a standard data interchange format such as Standard Generalized Markup Language (SGML), secondary data can be added to each related sentence as attributes in a tag. Secondary data added sentences of such a standard data interchange format have advantages that various types of information can be included in a tag and a data interchange is easy because such sentences are essentially written in text format.

Applying these advantages to a corpus, an annotated corpus, which has not only sentences but also secondary data relating to each sentence, is the current focus of attention.

A corpus is generally a computerized large collection of linguistic data included in various documents such as newspaper articles or screenplays, having the purpose of support for language description or language analysis. In other words, a corpus is a large collection of illustrations of daily usage in the form of electronic character data. In many case, a corpus is retrieved by using GREP, and a retrieval result is displayed on screen in Key Word in Context format (KWIC). Making use of a corpus brings convenient way of collocation searches to clarify a practical side of language expressions, and is useful for a natural language description or language analysis. A corpus is a collection of documents, and a document is a collection of sentences.

As a search method for a corpus, a full-text search methods is well used. For example, Unexamined Patent Publication (Kokai) No.8-137898 discloses an invention concerning a document retrieval system, expanding a user input key word into related key words referring to a concept dictionary, searching a corpus with the related key words, so as to improve accuracy of a search.

An annotated corpus mentioned above is a corpus that secondary data such as a part of speech, a lemma and so on are added to each syntactic unit of a document such as a word, a phrase or a chapter and so on as attributes of a tagged form. From the point of view of data input efficiency, most of annotated corpuses in use adopt a format adding secondary data to each word. A format of an annotated corpus is not limited to a tagged form, for example, a format divided simply by "/" can also be used. An annotated corpus are widely used in the field of language study or dictionary compilation. As an embodiment of an annotated corpus, The British National Corpus (BNC) and The Bank of English are known. The vast file size of each corpus amounts to a few Giga bytes.

One problem concerning with these corpuses is that, retrieval results of such a large corpus without utilizing secondary data (annotation) are often useless because too many matchings occur. Therefore, many linguists want to make use of secondary data such as a part of speech included in an annotated corpus in order to limit the number of retrieved sentences.

However, for the purpose of utilizing secondary data, a query has to be based on a special construction rule which is called "Corpus Query Language" (CQL). And a user has to learn practical expressions of each corpus, CQL, UNIX commands, software, programming and so on.

Further, many annotated corpuses in use are not suitable for fast retrieval because the formats of such corpuses are selected from the point of view of data input efficiency. For example, a retrieval of a phrase composed of more than one word such as "pretty woman" from a corpus, which is added secondary data on each word as attributes of SGML, takes much time.

SUMMARY OF THE INVENTION

In one aspect, the present invention relates to a retrieval system having an interface for intuitive operations to search secondary data added documents such as an annotated corpus without detailed knowledge about a format of each corpus, commands or programmings.

In one aspect, the present invention relates to a retrieval system and a database to retrieve secondary data added documents in a relatively short time.

In another aspect, the present invention relates to a retrieval system of a database storing secondary data added documents, said system including:

means for transmitting a graphical user interface (GUI) for searching having data entry fields configured in a matrix, to display on a user's display;

means for storing retrieval data input in one or more data entry field(s) of the GUI;

means for locating each data entry field in which each datum is input;

means for generating a query comprising query units, each unit being generated by using a set of retrieval data input in each one column of data entry fields of said matrix, and each unit corresponding to one element of said document, in the case that more than one column of data entry fields being input with retrieval data, generating a query so as to retrieve sentences having the same order of elements in each sentence as the order of said columns of data entry fields, in the case that only one column of data entry field being input with retrieval data, generating a query so as to retrieve sentences having an element corresponding to said retrieval data;

means for interpreting said query and searching said database;

means for transmitting search results to display on a user's display.

According to the fourth aspect of the present invention, we provide a program for a retrieval of a database storing secondary data added documents, said program including the step of:

transmitting a GUI having data entry fields configured in a matrix, to display on a user's display;

storing retrieval data being input in one or more data entry field(s) of a GUI for searching;

locating each data entry field being input with each datum;

generating a query comprising query units, each unit being generated by using a set of retrieval data input in each one column of data entry fields of said matrix, and each unit corresponding to one element of said document, in the case that more than one column of data entry fields being input with retrieval data, generating a query so as to retrieve sentences having the same order of elements in each sentence as the order of said columns of data entry fields, in the case that only one column of data entry field being input with retrieval data, generating a query so as to retrieve sentences having an element corresponding to said retrieval data;

interpreting said query and searching said database.

As a result, a retrieval of secondary data added documents becomes fast and accurate because elements of sentences are the unit of data input and searching.

As a result, a retrieval of secondary data added documents becomes fast and accurate because elements of sentences are the unit of data input and searching.

Additionally, examples of secondary data added document(s), except an annotated corpus, are a collection of genetic maps describing information of each part of genes, a collection of music with songs, or scores. The present invention could be applied to a database retrieval of gene or music information.

The present invention may be implemented with a stand-alone computer including a database, or with a client server system via network such as the Internet.

In the case of a client server system, a database can reside in a server, and a retrieval program can be installed in a client, or both of a database and a retrieval program can reside in the same server and an retrieval interface can be transmitted to a client. It will be appreciated that the present invention is not limited above mentioned variables.

BRIEF DISCRIPTION OF THE DRAWINGS

FIG. 3 is a schematic view of a GUI for searching, in accordance with a preferred embodiment of the present invention.

DETAILED DESCRIPTION OF PREFERRED EMBODIMENTS

Figure 1:
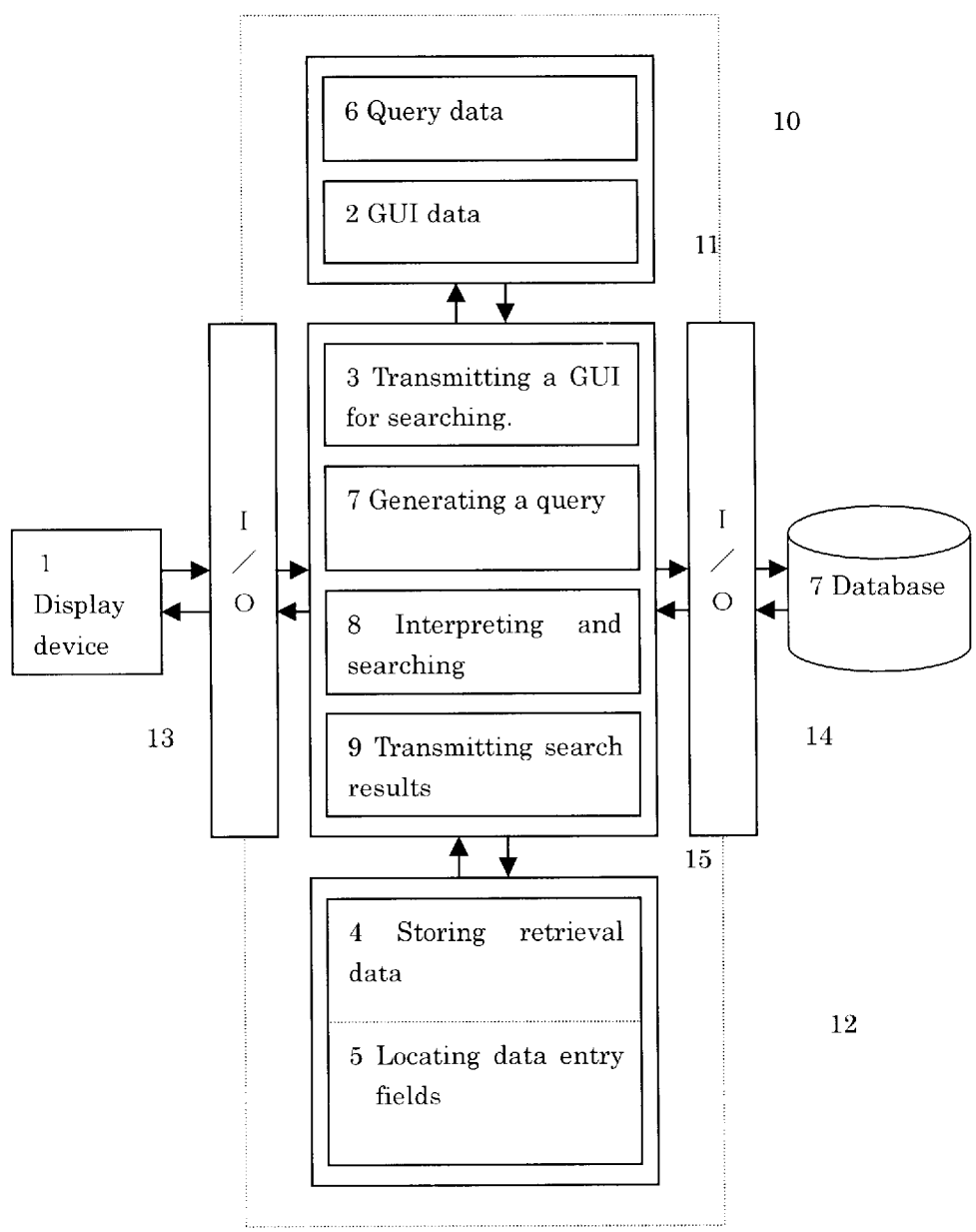
FIG. 1 is a schematic illustration of a system for searching in accordance with a preferred embodiment of the present invention.

FIG. 1 is a schematic illustration of a system for searching or a system installed with a program for searching, in accordance with a preferred embodiment of the present invention. A display device 1 and a database 7 are separated from the body of a system 10 indicated with dotted lines, and communicate with the system through input/output means 13,14. As mentioned above, it will be appreciated that the display device 1 and/or the database 7 can be unified with the system 10, and communication between the display device 1, the database 7 and the system 10 can be provided via network such as the Internet. In response to a user's request for transmission, means for transmitting 3 read out data of a GUI for searching 2 from a memory 11 send said data to a user's display device 1. The user's display device 1 receives said data and display a GUI for searching in which plural data entry fields are arranged in a matrix.

When a user input retrieval data into a search window of a display device 1, the retrieval data are transmitted through an I/O means 13 to a central processing unit 15, and are stored in means for storing 4 of memory 12. Though input data can be single or plural, means for locating 5 locate in which data entry field each datum is input. Means for generating a query 7 read out query data 6 from memory 11 and retrieval data from means for storing 4 of memory 12, then generate a query referring to data of means for locating 5. In the case that an annotated corpus is used as secondary data added documents, means for generating a query 7 generate a CQL query according to a CQL grammar. Query generating steps are discussed below with reference to FIG. 2 and FIG. 3. Means for interpreting and searching 8 interpret and convert said CQL query to a format suitable for the search engine of database 7, and search the database 7 along proper steps through I/O means 14. When a retrieval result is obtained, means for transmitting 9 configure a window to display the retrieval result in a KWIC format, and transmit the window data to a display device 1 through I/O means 13.

Next, in the case that an annotated corpus is used as secondary data added documents, retrieval process from the start to the end is explained with reference to FIG. 2 as follows.

In response to a user's request for transmission, a retrieval process is started (S0), and data of a GUI for searching is transmitted to a user's display device (S1). The GUI has data entry fields in a matrix to input plural retrieval data simultaneously. As shown in FIG. 3, for example, data entry fields of 3 rows and 5 columns are configured in a matrix, and the first row is a row of a word, the second row is a row of a part of speech (POS), the third row is a row of a Lemma. In addition, a concordancer check box to select whether a retrieval result has to be arranged in KWIC format, and a collocation check box to select whether a collocation table is to be generated, are also arranged. A maximum line number field is to limit the maximum number of match in order to reduce a CPU load. A display line number field is to limit the maximum number of line displayed at the same time. A sub-corpus field is to input a query to specify certain special code of user's interest, such as a genre code, appended in a header area of a corpus. Radio buttons aligned in a "Main button" row are to designate a word to be displayed at the center of a screen.

Returning to FIG. 2, when retrieval data are input in one or more data entry field(s) of a GUI for searching displayed on a user's screen (S2), the retrieval data are stored and are located in which data entry field each datum is input by specifying a field name, a location number, or an order number of a data entry field (S3). We give the name such a set of data which contents and input locations are specified as "a question pattern".

Next, query units are generated to retrieve elements of interest, each query unit corresponding with one element of interest, referring to input locations, combining one or more retrieval data which are input in data entry fields aligned in the same column (S4). Namely data entry fields of each column correspond to one element. Now, we suppose an element is a word, for example. A word "these" is input in the data entry field located at the first row and the first column in the matrix (we also suppose the first row is the row of "sentence expression"), and a part of speech "adjective" is input in the data entry field located at the second row and the first column in the matrix (we further suppose the second row is the row of "part of speech"), as described in the following table.

TABLE 1

|  | 1 | 2 | 3 |
|---|---|---|---|
| Sentence expression | These |  |  |
| Part of speech (POS) | adjective |  |  |
| Lemma |  |  |  |

A query unit, corresponding to this example, should be generated so as to retrieve only sentences which contains a word "these" and its part of speech is adjective.

Next, one case that retrieval data are input in more than one columns and the other case that retrieval data are input in only one column should be handled differently because each column corresponds to one element. Therefore, we decide whether the number of columns which are input with data is one or not (S5).

When the number of data input column is one, a query is generated by using the query unit corresponding to the column. It proceeds to a step of interpreting and searching (S7).

When the number of columns input data is more than one, a query is generated so as to the order of retrieval data corresponds to the order of interested elements (for example, order of words) in sentences (S6). A user can input data one by one according to the order of interested words in sentences at data entry fields of each column arranged in a GUI for searching. For example, when a user wants to retrieve sentences including words such as "women were" of this word order, the user inputs "women" in a data entry field at the first row first column, and also inputs "were" in a field at the first row second column. As a result, sentences including words "women were" in this order are retrieved, and sentences including the same words but only in reverse order such as "were women" are not retrieved. Therefore, a user can input retrieval data intuitively.

Each row in a matrix has each meaning. One row is a row to input sentence expressions, and another rows are rows to input secondary data. As mentioned above, the first row is a row to input sentence expressions such as "women" or "were", the second row is a row to input a part of speech such as "adjective" or "noun", the third row is a row to input a lemma, and so on.

For example, when a user wants to retrieve sentences including words such as "adjective (a part of speech)"+ "women (a sentence expression)"+"be (a lemma)" in this order, the user inputs "adjective" in a data entry field at the second row first column, and also inputs "women" in a field at the first row second column, and further inputs "be" in a field at the third row third column, as shown in Table 2.

TABLE 2

|  | 1 | 2 | 3 | 4 |
|---|---|---|---|---|
| Sentence expression |  | women |  |  |
| POS | adjective |  |  |  |
| Lemma |  |  | be |  |

As a result, sentences including phrases such as "these women are" and "those women were" are retrieved. In this example, the query does not retrieve sentences including another element(s) between the above mentioned elements such as "these beautiful women are". A query can be generated so as to retrieve sentences having another elements such as "beautiful" of the example. But preferably, a query does not retrieve such sentences.

In relation to this point, we explain another input example with reference to Table 3.

TABLE 3

|  | 1 | 2 | 3 | 4 |
|---|---|---|---|---|
| Sentence expression |  | 0–3 |  |  |
| POS | noun |  |  |  |
| Lemma |  |  | advise |  |

The question pattern shown in Table 3 is to retrieve sentences containing a noun followed by a word "advise" as a lemma within 4 words from the noun. In other word, the pattern means to retrieve sentences containing a noun collocating with a verb "advise" within four words on the left-hand side of the verb. This is to examine what types of subjects tend to combine with "advise".

As mentioned above, a user can retrieve information easily and straightforwardly according to this invention. Because steps for data input and retrieval are both essentially executed by using elements of sentences, such as a word, as a unit, and by reflecting words order of interest simultaneously. Further, a user can retrieve information faster by using a database suitable for the system.

In order to generate a query being able to acknowledge elements order in a document, order operators are available which can read element order in a corpus. Preferably, word order identifiers are used in this embodiment as mentioned below.

It will be appreciated that secondary data are not limited to above mentioned a part of speech and a lemma, rather every secondary data included in the documents like an annotated corpus are available. Therefore, the number of rows for secondary data can be decided by considering the number of kinds of secondary data.

Kinds of data input in data entry fields are not limited, not only simple characters but also regular expressions are also available for that.

For easier and more simplified operation, input data can be limited by displaying a pull-down menu and so on.

As explained above, retrieval data contained in a question pattern are processed so as to retrieve sentences containing word order corresponding to column order which are input with retrieval data, though retrieval data input in each field are fundamentally connected by AND operations.

Plural retrieval data can be input simultaneously in one data entry field, being construed to be connected by OR operation. Data can be input by using "|" based on regular expressions to divide each datum, or by using a space alternatively.

A query satisfying the above mentioned conditions is generated according to CQL (S4–S6). A query can be constructed by using known regular expressions.

Figure 2:
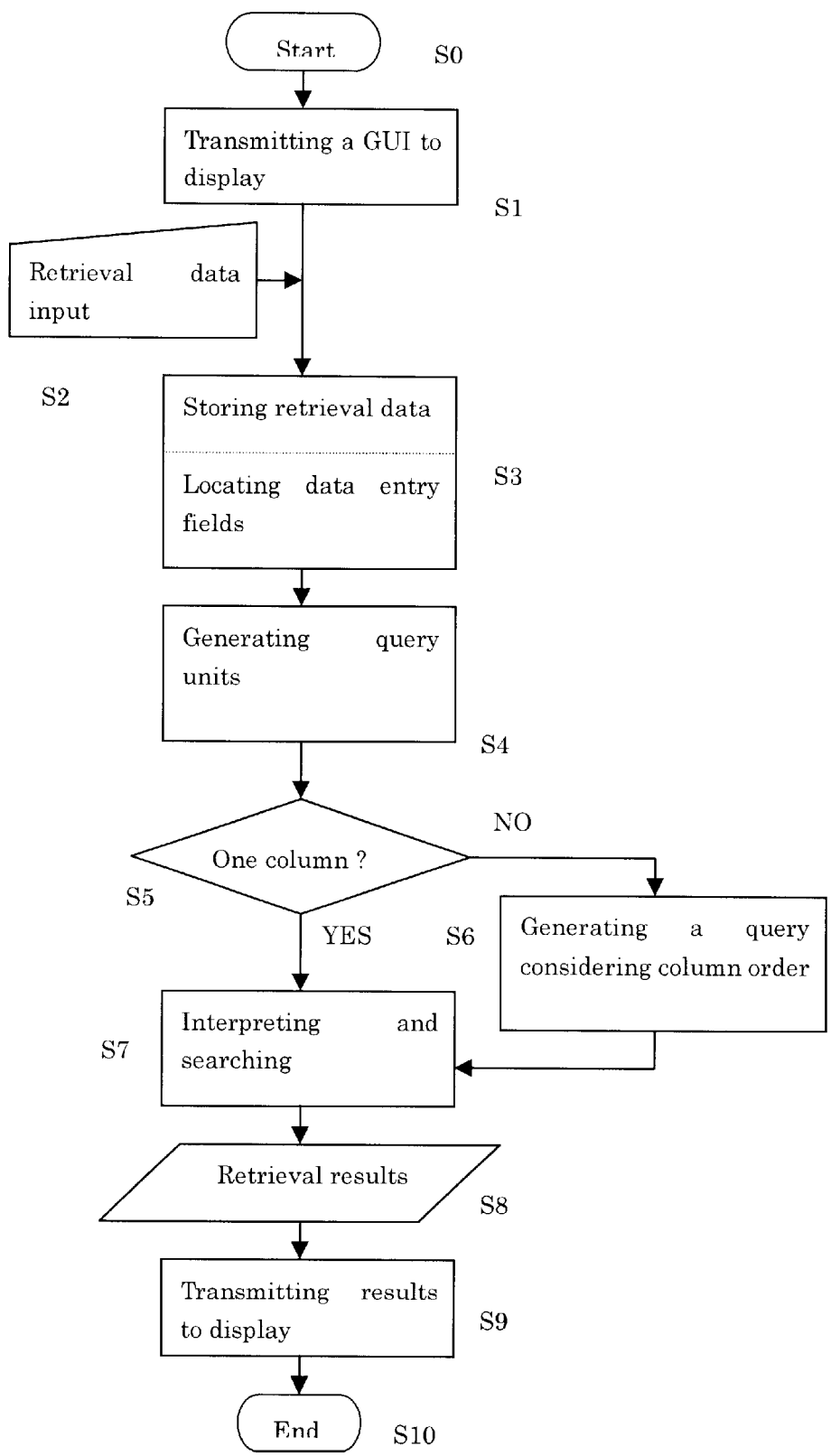
FIG. 2 is a flow chart illustrating retrieval steps, in accordance with a preferred embodiment of the present invention.

A step for generating each query unit (S4) and a step for deciding (S5) shown in FIG. 2 can be changed in reverse order.

After generation of a CQL query as mentioned above, a step for interpreting and searching (S7) begins. The CQL query is interpreted and converted to a format suitable for a search engine of a database storing an annotated corpus, and the database is searched along proper steps.

If a question pattern has certain regular expression such as a backward match including a part of a key word (an incomplete key word), a retrieval time tends to be longer in general, or some databases do not deal with such a pattern. In such a case, it is preferable to pick up an incomplete key word from a regular expression, and convert the incomplete key word to a corresponding set of complete key words, then execute a search by using the set of complete key words. If a question pattern has more than one incomplete key words, it is preferable to convert at least one incomplete key word to a set of complete key words, and it is more preferable to convert more than one incomplete key words to sets of complete key words. In the latter case complete key words sets of the same number of incomplete key words are obtained. These sets are logically multiplied, and by using this resultant conjunction is alternative retrieval data, faster search can be performed consequently.

A database can store data of an annotated corpus in its original form. However, it is preferable to convert the original corpus data beforehand to perform a fast search, as mentioned below. A database structure can be selected so as to perform a high-speed search and to maintain a database easily.

After a retrieval result is obtained (S8), the result is arranged in a KWIC format as shown below, and the result is transmitted to a user's display device (S9), and then a retrieval process finally completes (S10).

```
. . . . . those women were cute . . . .
. . . . . those women were beautiful . .
. because, more women are at home . . .
. . . . . . . . . . . . . . . . . . . .
. . . . . . . . . . . . . . . . . . . .
```

Utilizing a medium storing one or more of the above mentioned programs, the same retrieval can be performed as mentioned above.

Next, we explain a suitable database for the above mentioned retrieval system for high-speed search of an annotated corpus.

An example following an actual annotated corpus is shown below. This example is originated from a sentence "These women were cute.", and the sentence is annotated with parts of speech and lemmas as attributes of SGML tags.

<w adjective these>These <w noun woman>women <w verb be>were w adjective cute>cute <w end.>.

This example can be expressed with a standard format as shown above, and can be expressed with an alternative one which is divided into three parts simply by using "/" as follows.

adjective/these/These noun/woman/women verb/be/were adjective/cute/cute end/./.

A database can store an annotated corpus in its original form as a flat file. However, typically it takes a long time to search an annotated corpus of a flat file because an annotated corpus has usually a volume amount to a few Giga-bytes. Therefore, it is important to prepare indexes associated with a specific structure of each annotated corpus in order to perform a high-speed search. For this reason, a relational database, an object-oriented database, a specialized database for XML and the like are suitable for a database of an annotated corpus.

Figure 4:
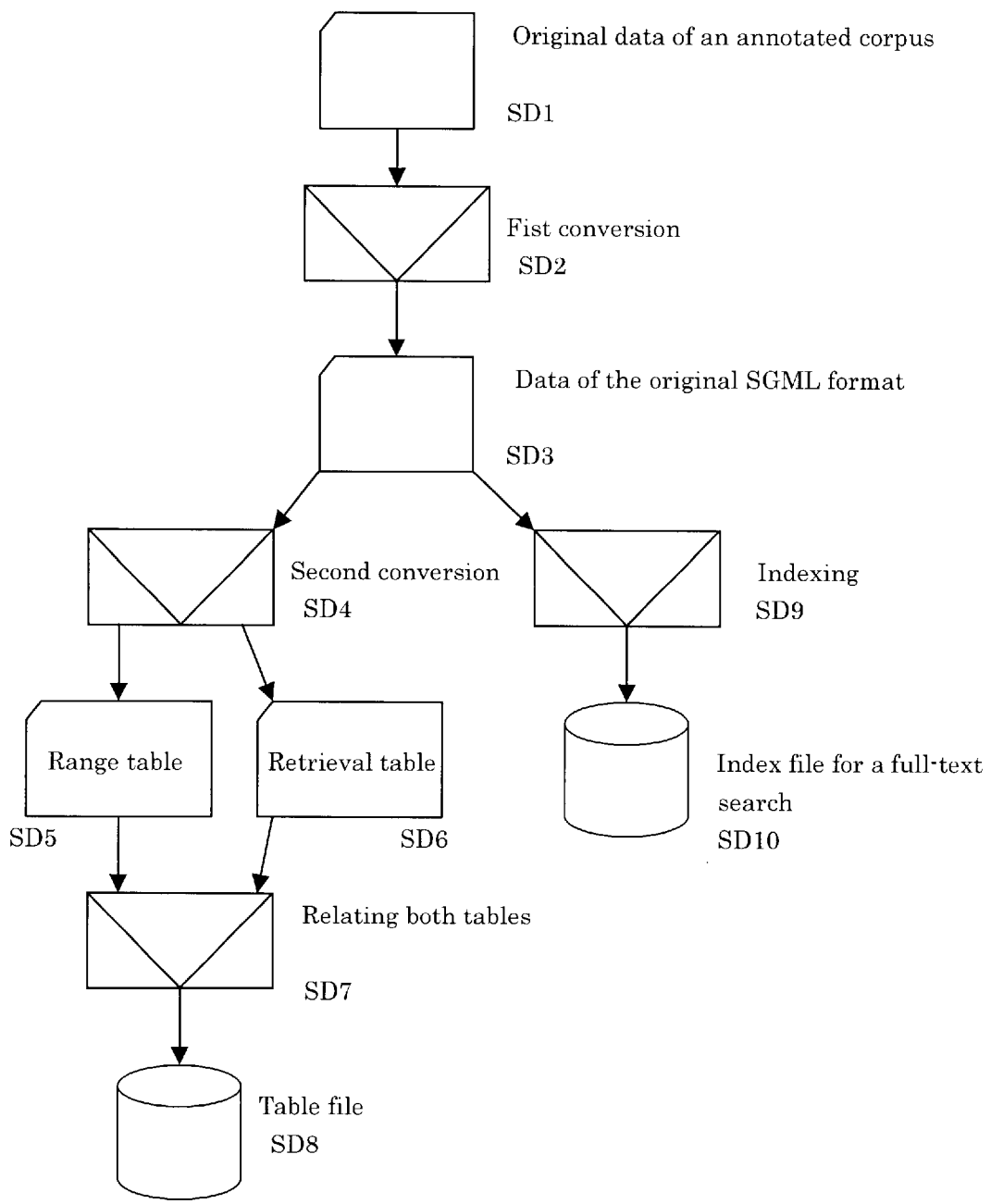
FIG. 4 is a schematic flow chart illustrating a construction of a database comprising a relational database and a full-text search database, in accordance with a preferred embodiment of the present invention.

Next, a preferred embodiment of a database suitable for this invention consisting of a relational database and a full-text search database is discussed hereinbelow with reference to FIG. 4.

First, an original data of an annotated corpus (SD1) is converted so as to optimize performance of a full-text search (SD2) to a tagged form of the following structure:

```
<sentence 1>
    <word>These women are cute.
    <part of speech>
    <lemma>
</sentence>
<sentence 2>
The rest is omitted
```

Each sentence gets a sentence identification number at the SD2 step, and gives the number to an attribute of each sentence tag. We give the name the above shown format as "the original SGML format" (SD3).

Next, a corpus of this format is indexed for a full-text search (SD9). An index file for a full text search is obtained (SD10). An index file is indexed on each character of a corpus, for example, one byte for each alphanumeric character and two bytes for each kanji character, so as to retrieve every partial character string. We give the name these index numbers as file offset values. Based on these file offset values, retrieved character strings can be specified where they locate in a corpus of an original SGML format. Indexing can be processed by using an off-the-shelf software for a full-text search which can index on each character and return file offset values to a retrieval result. An index file for a full-text search is essentially one file.

Next, an annotated corpus of an original SGML format is converted again (SD4) to generate a retrieval table such as shown In Table 4 (SD6).

TABLE 4

| Document identifier | 1 | 1 | 1 | 1 | 1 |
|---|---|---|---|---|---|
| Sentence identifier | 1 | 1 | 1 | 1 | 1 |
| Word order identifier | 1 | 2 | 3 | 4 | 5 |
| Sentence expression | These | women | were | cute | . |
| Part of speech | adjective | noun | verb | adjective | end |
| Lemma | these | woman | be | cute | . |

A retrieval table is essentially one table containing sentence identifiers, word order identifiers, all elements of sentences (sentence expression), and all of secondary data being necessary to be retrieved. Word order identifiers are added on each word from the beginning of each sentence to identify word location in each sentence. A retrieval table comprises a row of sentence identifiers, a row of word order identifiers, a row of sentence expressions, and one or more row(s) of secondary data. As shown in Table. 4, a retrieval table can contain a row of document identifiers to identify a document including each sentence. Each column corresponds to each element, and each element identifier and secondary data corresponding to each element are aligned in a same column. Two examples of data input, shown above, are a case that an element of sentences is supposed to be a word and secondary data are supposed to be limited to parts of speech and lemmas. With reference to the second example of data input, shown above, the word order identifier of "women" is "2" because "women" is the second word of the sentence. Therefore, the element "women" and its word order identifier "2" are aligned in the same column. Further, because its part of speech is a noun, the row of parts of speech of the same column is filled with "noun". The lemma "woman" is also filled in the corresponding place in the same way.

At the second conversion step "SD4", a range table such as shown in Table 5 is also generated (SD5).

TABLE 5

| Range of file offset values | sentence identifier |
|---|---|
| 0–200 | 1 |
| 201–300 | 2 |
| 301–500 | 3 |
| . | . |
| . | . |
| . | . |

In the same way to the end.

A range table is essentially one table consisting of sentence identifiers and ranges of file offset values, and each identifier and each range are associated with each other.

Finally, a table file (SD8) is prepared by relating a retrieval table with a range table through sentence identifiers (SD7). An off-the-shelf software of a relational database can be used to create the above mentioned database.

It is preferable to prepare a header table containing header information of documents such as document identifiers, titles of documents, genres of documents, as shown in Table 6. A header table is related with a retrieval table through sentence identifiers. By preparing this table, a detailed search becomes easy which focuses on a genre of documents, for example. In this way, a database suitable for this invention is obtained.

TABLE 6

| Document identifier | 1 | 2 | 3 | 4 |
|---|---|---|---|---|
| Title of document | | | | |
| Author | | | | |
| Publishing company | | | | |
| Publication date | | | | |
| Field code | | | | |
| Copyright notice | | | | |

Figure 5:
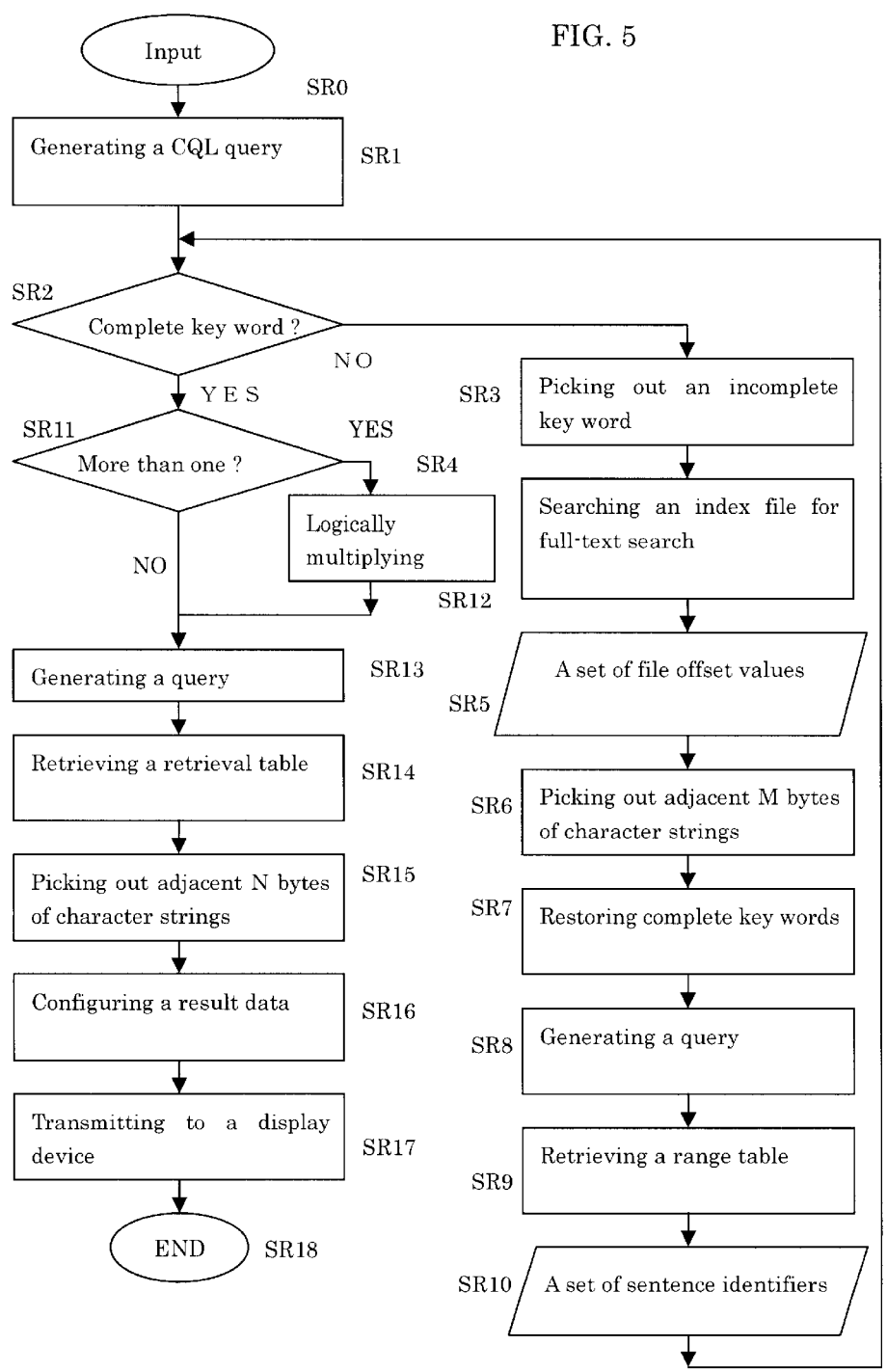
FIG. 5 is a flow chart illustrating retrieval steps using a relational database and a full-text search database, in accordance with a preferred embodiment of the present invention.

Next, a retrieval procedure by using the above mentioned database is discussed with reference to FIG. 5.

When a question pattern input in said interface (SR0), a CQL query mentioned above is generated according to the question pattern (SR1). At the beginning of interpreting and searching procedure (SR2–SR14), a decision is made whether regular expressions are included in the CQL query, namely, in the question pattern (SR2).

If the CQL query includes no regular expression in other words, the query is expressed with alpha-numeric characters used in sentences and secondary data (which is called a complete key word pattern), the number of sets of document identifier is decide (SR11). One set of document identifiers is obtained by processing around the loop path which starts from SR2 branches to the right and returns to SR2 via SR10. Therefore, in the case that the query includes no regular expression, the number of sets of document identifiers is zero. Immediately advancing to the next step (SR13), a query based on an interpretation of the CQL query is generated according to Structured Query Language (SQL). A retrieval table is searched by using this query whether there is a match between key words in a question pattern and words or attributes in a retrieval table. Starting from key words including in the first column of a question pattern, advancing to the right column one by one, corresponding to column orders of table data, key word matchings are processed (SR14). Collecting N bytes word data adjacent to each key word of matched sentences (SR15), configuring a result display data in a format such as KWIC (SR16), transmitting said data to a display device (SR17), a retrieval procedure completes (SR18).

If the question pattern includes one or more regular expression(s) (an incomplete key word pattern), a retrieval table can not be searched directly. Therefore, branching to the right step from SR2, a part of an element (an incomplete key word) included in the first found regular expression of a question pattern is picked up (SR3). For example, in the case that a question pattern includes a regular expression for an afterward match such as ".*ful", the incomplete key word "full" is picked out, and an index file for full-text retrieval is searched by using "full" (SR4). As a result, a set of all file offset values of character strings containing "full" is obtained (SR5). M bytes of character strings are picked out so as to correspond to a regular expression from adjacent character strings of an incomplete key word pointed by each of the above mentioned file offset values (SR6). Then, complete key words are restored by using character strings put between spaces of the above mentioned m bytes of character strings (SR7). Restoration of complete key words allows a high-speed retrieval. In the case of the above mentioned regular expression ".*full", m bytes of character strings preceding from a key word pointed by a file offset value concerning "full" are picked out, and complete key words are restored by using character strings front divided by a space and derived from these m bytes of character strings. A complete key word can be restored corresponding to each file offset value. For example, one complete key word "beautiful" is restored corresponding to one file offset value associated with "full", and another complete key word "successful" is restored corresponding to another file offset value. Restoration of complete key words burdens a CPU with a load because character matchings have to be done one character by one character. But, a query suitable for a retrieval table can be generated later by using these restored complete key words and sentence identifiers at a step SR13. As a result, a retrieval becomes faster. If a retrieval table is searched without restoration of complete key words, character matching whether there is a match between a character string "ful" and a character string of each word in a retrieval table at every character should be necessary. As a result, a high-speed retrieval remains difficult. Next, a query for a retrieval table is generated by using each file offset value (SR8), and a range table is retrieved by the query (SR9), then a set of sentence identifiers associated with sentences containing a character string "full" is obtained (SR10). Because each complete key word and each sentence identifier are both correspond to certain file offset value, a set of sentence identifier is are arranged so as to generate a table, as shown in Table 7.

TABLE 7

| Complete key word | Sentence identifier |
|---|---|
| beautiful | 1 |
| beautiful | 3 |
| beautiful | 5 |
| careful | 2 |
| careful | 8 |
| careful | 10 |
| careful | 11 |
| successful | 3 |
| successful | 7 |

After a set of sentence identifiers is obtained, the process returns to a step SR2, deciding whether there remains another regular expression in the question pattern (SR2). If there remains no regular expression, the process continues at step SR11. If a second regular expression is found in the question pattern, turning to the right again from SR2, the same procedure is followed as the first regular expression is processed (SR2–SR10). As a result, second set of sentence identifiers is obtained. In the case of a regular expression such as "sub.*", for example, a second set of sentence identifiers is obtained as shown in Table 8.

TABLE 8

| Complete key word | Sentence identifier |
|---|---|
| subscribe | 2 |
| subscribe | 5 |
| submit | 8 |
| submit | 11 |

Following the loop path from SR2 via SR10 to SR2 is repeated the same number of times as the number of regular expressions contained in a question pattern, and the same number of sets of sentence identifiers as the number of regular expressions are obtained. The number of regular expressions to be converted to sets of complete key words may be limited. In this case, after passing the loop path predetermined number of times the path branches downward compulsorily. After all of regular expressions contained in a question pattern, or alternatively, predetermined number of regular expressions are converted to sets of complete key words, the path branches downward from SR2.

Next, a decision is made whether the number of sets of sentence identifiers is more than one or not (SR11). If the number of sets of sentence identifiers is zero or one, the process continues at SR13. If the number of sets of sentence identifiers is more than one, these sets are logically multiplied each other to obtain a set of conjunction, such as shown in Table 9 (SR12).

TABLE 9

| Complete key word | Sentence identifier |
|---|---|
| careful subscribe | 2 |
| beautiful subscribe | 5 |
| careful submit | 8 |

Order of complete key words in Table 9 is determined so as to correspond to order of columns of data entry fields in which the question pattern is input.

When plural regular expressions are included in a question pattern, it is preferable to convert all incomplete key words contained in regular expressions into complete key words.

Because, the more complete key words are used, the faster a retrieval process becomes.

But, while restoration of complete key words takes time in proportion to the number of complete key words, a degree of retrieval speed-up by an increase of complete key words becomes smaller in inversely proportion to the number of complete key words. That is the reason why a retrieval result tends to be more restricted corresponding to an increase of complete key words. Therefore, it is most effective to convert a regular expression of a first column of a question pattern, which is a retrieval start point and a first retrieval condition, into complete key words. A conversion of a regular expression of a second column is secondary effective. In the same way, a conversion of third column data is thirdly effective and so on. Therefore, in the case that plural regular expressions are included in a question pattern, it is preferable at least to convert a regular expression input in the first column.

Next, generating a query for RDB (SR13), and processing in the same way as mentioned above (SR14–SR17), a retrieval process completes (SR18).

It is preferable to use the above mentioned database as a database of the present invention. It is also preferable to use the above mentioned database as a database of the above mentioned programs.

It will be appreciated by persons skilled in the art that the present invention is not limited to what has been particularly shown and described hereinabove.

As mentioned above, the retrieval system of the present invention is suitable for a retrieval of an annotated corpus which is useful for a study of practical side of language expressions. Further, a retrieval system of the present invention can be used to retrieve secondary data added sentences such as a genetic map or music.

What is claimed is:

1. A retrieval system of a database storing secondary data added documents, said system comprising:

means for transmitting a graphical user interface (GUI) for searching having data entry fields configured in a matrix, to display on a user's display;

means for storing retrieval data input in one or more data entry field(s) of the GUI;

means for locating each data entry field in which each datum is input;

means for generating a query comprising query units, each unit being generated by using a set of retrieval data input in each one column of data entry fields of said matrix, and each unit corresponding to one element of said document, in the case that more than one column of data entry fields being input with retrieval data, generating a query so as to retrieve sentences having the same order of elements in each sentence as the order of said columns of data entry fields, in the case that only one column of data entry field being input with retrieval data, generating a query so as to retrieve sentences having an element corresponding to said retrieval data;

means for interpreting said query and searching said database;

means for transmitting the search results to display on a user's display.

2. A retrieval system of claim 1, wherein said means for interpreting a query and searching a database comprising converting at least one incomplete key word to a set of complete key words when retrieval data contain certain regular expression(s) comprising one or more incomplete key word(s), and starting a search afterwards.

3. A retrieval system of claim 1, wherein said means for interpreting a query and searching a database further comprise logically multiplying sets of complete key words converted from each regular expression containing an incomplete key word, when retrieval data contain regular expressions which comprise incomplete key words and at least two or more incomplete key words are converted to complete key words.

4. A program for a retrieval of a database storing secondary data added documents, said program comprising the steps of:

transmitting a GUI having data entry fields configured in a matrix, to display on a user s display;

storing retrieval data being input in one or more data entry field(s) of a GUT for searching;

locating each data entry field being input with each data;

generating a query comprising query units, each unit being generated by using a set of retrieval data input in each one column of data entry fields of said matrix, and each unit corresponding to one element of said document, in the case that more than one column of data entry fields being input with retrieval data, generating a query so as to retrieve sentences having the same order of elements in each sentence as the order of said columns of data entry fields, in the case that only one column of data entry field being input with retrieval data, generating a query so as to retrieve sentences having an element corresponding to said retrieval data;

interpreting said query and searching said database.

5. A program of claim 4, wherein interpreting a query and searching a database comprise converting at least one incomplete key word to a set of complete key words before a search in the case that retrieval data contain certain regular expression(s) including one or more incomplete key word(s).

6. A program of claim 5, wherein interpreting a query and searching a database further comprise logically multiplying said sets of complete key words before a search in the case that retrieval data contain plural regular expressions including incomplete key words and at least two or more incomplete key words are converted to sets of complete key words.

7. A program of claim 6, said database comprising:

an index file for a full-text search containing sentences and secondary data, all sentences and secondary data being indexed by a file offset value on each character;

a retrieval table having a row of sentence identifiers, a row of element order identifiers, a row of sentences, and rows of secondary data that each row corresponding to one kind of secondary data, arranging each column so as to correspond to each element of a sentence, aligning every element of sentences and corresponding secondary data in a same column;

a range table specifying sentence identifiers and corresponding ranges of file offset values.

8. A program of claim 5, said database comprising:

an index file for a full-text search containing sentences and secondary data, all sentences and secondary data being indexed by a file offset value on each character;

a retrieval table having a row of sentence identifiers, a row of element order identifiers, a row of sentences, and rows of secondary data that each row corresponding to one kind of secondary data, arranging each column so as to correspond to each element of a sentence, aligning every element of sentences and corresponding secondary data in a same column;

a range table specifying sentence identifiers and corresponding ranges of file offset values.

9. A program of claim 4, said database comprising:

an index file for a full-text search containing sentences and secondary data, all sentences and secondary data being indexed by a file offset value on each character;

a retrieval table having a row of sentence identifiers, a row of element order identifiers, a row of sentences, and rows of secondary data that each row corresponding to one kind of secondary data, arranging each column so as to correspond to each element of a sentence, aligning every element of sentences and corresponding secondary data in a same column;

a range table specifying sentence identifiers and corresponding ranges of file offset values.

10. A medium storing at least one program, the program comprising the steps of:

transmitting a GUI having data entry fields configured in a matrix, to display on a user s display;

storing retrieval data being input in one or more data entry field(s) of a GUI for searching;

locating each data entry field being input with each data;

generating a query comprising query units, each unit being generated by using a set of retrieval data input in each one column of data entry fields of said matrix, and each unit corresponding to one element of said document, in the case that more than one column of data entry fields being input with retrieval data, generating a query so as to retrieve sentences having the same order of elements in each sentence as the order of said columns of data entry fields, in the case that only one column of data entry field being input with retrieval data, generating a query so as to retrieve sentences having an element corresponding to said retrieval data;

interpreting said query and searching said database.

11. A retrieval system having a database, said database comprising:

an index file for a full-text search containing sentences and secondary data, all sentences and secondary data being indexed by a file offset value on each character;

a retrieval table having a row of sentence identifiers, a row of element order identifiers, a row of sentences, and rows of secondary data that each row corresponds to one kind of secondary data, arranging each column so as to correspond to each element of a sentence, aligning every one element of sentences and corresponding secondary data in a same column;

a range table specifying sentence identifiers and corresponding ranges of file offset values.

* * * * *